United States Patent
Thormaehlen et al.

(10) Patent No.: US 8,868,600 B2
(45) Date of Patent: *Oct. 21, 2014

(54) VALUE HELP SEARCH SYSTEM AND METHOD

(75) Inventors: Frederik Thormaehlen, Mannheim (DE); Robert Lorch, Dossenheim (DE)

(73) Assignee: SAP AG, Walldorf (DE)

( * ) Notice: Subject to any disclaimer, the term of this patent is extended or adjusted under 35 U.S.C. 154(b) by 283 days.

This patent is subject to a terminal disclaimer.

(21) Appl. No.: 12/569,780

(22) Filed: Sep. 29, 2009

(65) Prior Publication Data

US 2011/0078183 A1 Mar. 31, 2011

(51) Int. Cl.
*G06F 17/30* (2006.01)
*G06F 7/00* (2006.01)

(52) U.S. Cl.
CPC .............................. *G06F 17/30522* (2013.01)
USPC ........................... 707/770; 707/762; 707/767

(58) Field of Classification Search
CPC ..................... G06F 17/30502; G06F 17/05223
USPC .......................................... 707/762, 767, 770
See application file for complete search history.

(56) References Cited

U.S. PATENT DOCUMENTS

| | | | |
|---|---|---|---|
| 5,483,654 A | | 1/1996 | Staron et al. |
| 5,812,840 A * | | 9/1998 | Shwartz ................................ 1/1 |
| 5,995,979 A * | | 11/1999 | Cochran ............................... 1/1 |
| 6,574,631 B1 | | 6/2003 | Subramanian et al. |
| 7,216,351 B1 | | 5/2007 | Maes |
| 7,293,253 B1 | | 11/2007 | Soukup |
| 7,971,183 B2 | | 6/2011 | Grechanik et al. |
| 8,122,444 B2 | | 2/2012 | Grechanik et al. |
| 8,656,342 B2 | | 2/2014 | Grechanik et al. |
| 2002/0147725 A1 | | 10/2002 | Janssen et al. |
| 2003/0069882 A1 * | | 4/2003 | Nieswand et al. ................ 707/5 |
| 2004/0117397 A1 | | 6/2004 | Rappold, III |
| 2004/0199537 A1 | | 10/2004 | Duff et al. |
| 2006/0048165 A1 * | | 3/2006 | Kautzleben et al. .......... 719/329 |
| 2006/0265232 A1 | | 11/2006 | Katariya et al. |
| 2007/0011126 A1 | | 1/2007 | Conner et al. |
| 2007/0226168 A1 * | | 9/2007 | Mukundan et al. ............... 707/1 |
| 2007/0266342 A1 | | 11/2007 | Chang et al. |
| 2007/0271107 A1 | | 11/2007 | Fiedler et al. |
| 2008/0082569 A1 | | 4/2008 | Mansour et al. |
| 2008/0120628 A1 * | | 5/2008 | Liang ............................ 719/328 |
| 2008/0209348 A1 | | 8/2008 | Grechanik et al. |
| 2008/0209446 A1 | | 8/2008 | Grechanik et al. |
| 2009/0037896 A1 | | 2/2009 | Grechanik et al. |

(Continued)

OTHER PUBLICATIONS

Non-Final Office Action for U.S. Appl. No. 12/569,788, mailed Jan. 30, 2012, 19 pages.

(Continued)

*Primary Examiner* — Shew-Fen Lin

(57) ABSTRACT

A computer-implemented system and method for implementing a value help search that includes receiving a value help search criteria from a user and sending the value help requests to multiple backend systems using a server computer system in a service oriented architecture system. Sending the value help search criteria may include a specific search help name to one of the multiple backend systems. The value help search service receives both metadata and result data from said one of the multiple backend systems. The metadata describes the structure of a search results. The value help search service may generate a search result table from the result data received from the backend system.

16 Claims, 8 Drawing Sheets

(56) References Cited

U.S. PATENT DOCUMENTS

| | | | |
|---|---|---|---|
| 2009/0063442 | A1 | 3/2009 | Gaurav et al. |
| 2009/0094274 | A1 | 4/2009 | Gorelik et al. |
| 2009/0132405 | A1 | 5/2009 | Scipioni et al. |
| 2009/0150434 | A1 | 6/2009 | Ruth et al. |
| 2011/0078569 | A1 | 3/2011 | Lorch |

OTHER PUBLICATIONS

Delisle, "Searching Data using phpMyAdmin and MySQL", Feb. 2009, retrieved via the internet at http://www.packtpub.com/article/searching-data-using-phpmyadmin-and-mysql on Jan. 14, 2012, 9 pages.

Delisle, "The Multi-Table Query Generator using phpMyAdmin and My SQL", Feb. 2009, retrieved via the internet at http://www.packtpub.com/article/multi-table-query-generator-using-phpmyadmin-mysql on Jan. 14, 2012, 10 pages.

Non-Final Office Action Response for U.S. Appl. No. 12/569,788, filed Mar. 27, 2012, 14 pages.

Final Office Action for U.S. Appl. No. 12/569,788, mailed May 8, 2012, 30 pages.

Non-Final Office Action received for U.S. Appl. No. 12/569,788, mailed on Dec. 5, 2013, 44 pages.

Final Office Action received for U.S. Appl. No. 12/569,788, mailed on Apr. 2, 2014, 51 pages.

Kodali, Raghu R., "What is service-oriented architecture? An Introduction to SOA," JavaWorld, Jun. 13, 2005, 6 pages.

\* cited by examiner

INPUT

Ivmaxofrows: [　　　]
Ivselfielddesc: [　　　]
Ivshlpname: [PREMK] [Submit]

| Langu | Fieldtext | Scrtexm | Fieldname | Position | Offset | Scrtexts | Scrtextl | Shlpname | Leng | Tabname | Reptext |
|---|---|---|---|---|---|---|---|---|---|---|---|
| E | Payroll Area | Payroll Area | ABKRS | 0005 | 000015 | Payr.area | Payroll area | PREMK | 000002 | M_PREMK | PArea |
| E | Company code | Company co | BUKRS | 0006 | 000018 | CoCode | Company Code | PREMK | 000004 | M_PREMK | CoCd |
| E | Cost Center | Cost Center | KOSTL | 0007 | 000023 | Cost Ctr | Cost Center | PREMK | 000010 | M_PREMK | Cost Ctr |
| E | Organizational | Org. Unit | ORGEH | 0008 | 000034 | Org.Unit | Organizational unit | PREMK | 000008 | M_PREMK | Org.unit |
| E | Organizational | Org.Key | VDSK1 | 0009 | 000043 | Org.key | Organizational Key | PREMK | 000014 | M_PREMK | Organizational |
| E | Administrator | Group | SBMOD | 0010 | 000058 | Group | Administrator group | PREMK | 000004 | M_PREMK | Grp |
| E | Administrator | Time admin | SACHZ | 0011 | 000063 | Time | Time administrator | PREMK | 000003 | M_PREMK | TAdmin |
| E | Personal No. | Personal No | PERNR | 0012 | 000067 | PersNo. | Personal number | PREMK | 000008 | M_PREMK | PersNo |
| E | Formatted Nam | Emp/app | ENAME | 0013 | 000076 | Name | Employee/app.name | PREMK | 000040 | M_PREMK | Name of employe | item

Helpvalues

| 1000 | 1DAXX1000 | 00000002300 | 500000565 | 100000000002300 | 1000 | 00900181 | Manfred Reinhart | 20000101 | 99991231 |
| 1000 | 1DCXX1000 | 0000004220 | 500000062 | 100000000004220 | 1000 | 00900181 | Facial Ben Adbelhak | 19980101 | 99991231 |
| 1000 | 1DCXX1000 | 000000000 | 100000000002200 | 1000 | | 00900132 | Peter Zinßmeister | 19980901 | 99991231 |
| 1000 | 1DCXX1000 | 000040025 | 1000 | | | 00091140 | Adam Muller | 20031001 | 99991231 |
| 1000 | 1DCXX1000 | 00000040009 | 00040009 | 1000 | | 1000 | 00091021 | Lisa Muller | 19990620 | 99991231 |
| 1000 | 1DCXX1000 | 00000040009 | 00040009 | 1000 | | | | 19990620 | 99991231 |

VALUE HELP SEARCH SYSTEM AND METHOD

BACKGROUND OF THE DISCLOSURE

Service oriented architecture (SOA) encapsulates application logic in services with a uniformly defined interface, making these services publicly available via discovery mechanisms. SOA applications and applicants may send messages as the basic unit of communication. SOA applications may be a composite of various integrated services that each perform distinct functions and that can be individually modified without affecting the performance of other services. Since SOA may be structured to be platform independent, SOA implemented architecture allows for greater interoperability between different platforms. In SOA applications, as in other architectures, there is often a need to provide value help functionality that provides help to users entering values in a graphical user interface. Enhanced mechanisms for providing such value help are needed.

SUMMARY OF THE DISCLOSURE

A computer-implemented method for implementing a value help search that includes receiving a value help search criteria from a user and sending the value help requests to multiple backend systems using a server computer system in a service oriented architecture system. Sending the value help search criteria may include a specific search help name to one of the multiple backend systems. The value help search service receiving both metadata and result data from said one of the multiple backend systems, the metadata describing the structure of a search results. The value help search service may generate a search result table from the result data received from said one of the multiple backend system.

BRIEF DESCRIPTION OF THE DRAWINGS

FIG. 7 is a screen display that shows example metadata and the result data that may be returned as a search perform by a backend system.

FIG. 8 is a screen display that may be shown to the user when the user requests value help.

DETAILED DESCRIPTION

Figure 1:
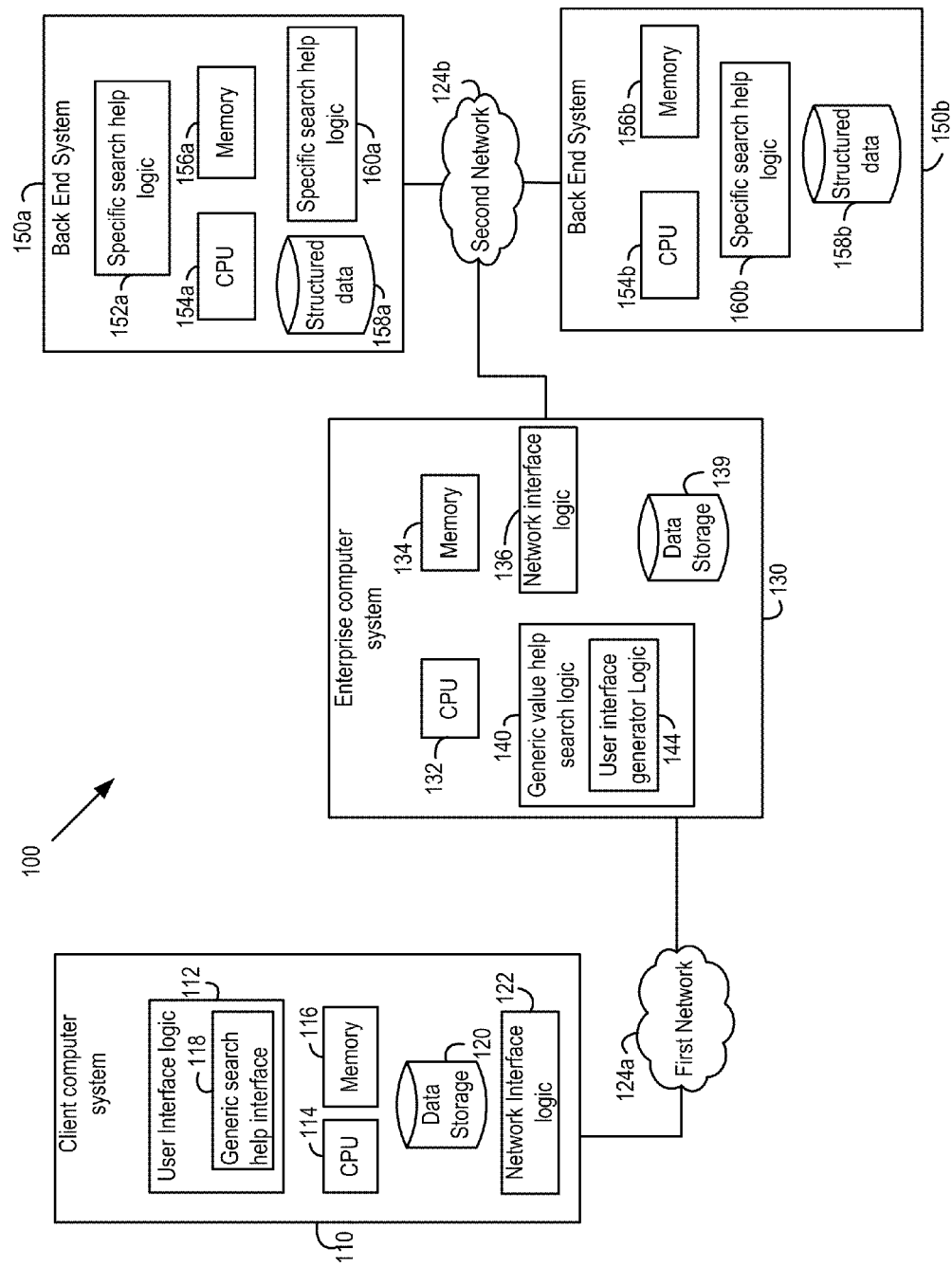
FIG. 1 is a schematic diagram of an enterprise system according to an embodiment of the present invention.

Referring to FIG. 1, FIG. 1 shows a schematic diagram of a system 100 according to an example embodiment of the present invention. The system 100 may include a client computer system 110, first network 124a, second network 124b, enterprise computer system 130, back end system 150a and back end system 150b. In an example embodiment, the client computer system 110, enterprise computer system 130 and the back end systems 150a and 150b may be several computing systems that may be connected via a network. Similarly, in another example embodiment, the enterprise computer system 130 and the back end system 150a and 150b may be implemented on a single computing system connected via a network.

The client computer system 110 may include, among other systems, a user interface logic 112, central processing unit (CPU) 114, memory 116, generic search help interface 118, data storage 120 and a network interface logic 122. The client computer system 110 may include a computing system, for example, comprising one or more networked computers that are programmed to perform the various functions described herein. These functions include generating a user interface, and/or sending search criteria to the enterprise computer system 130 by using the network interface logic 122. Such functionality may further include, processing the response received from the enterprise computer system 130 and displaying the values for the user or updating the data storage 120. The user interface logic 112 (e.g., a web browser, an application program, etc.) may include a generic search help interface 118 that may be configured to receive user interface information from the enterprise computer system 130. The user interface logic 112 may be configured to present (e.g., screen displays) user interfaces based on the information received from the enterprise computer system 130. The user interface logic 112 logic may receive input from the user and process the input as a search criteria or receive input in the form of a mouse and/or a keyboard. In another embodiment other electronically interactive devices may be utilized. The CPU 114 may be used to process and/or compute instructions and manipulate data. The CPU 114 may be formed using multiple processor or a single processor. The memory 116 may be used primarily to store data for CPU 114.

Network interface logic 122 may facilitate communication between the enterprise computer system 130, the first network 124a and the back end systems 150a and 150b. The network interface logic 122 permits the client computer system 110 and enterprise computer system 130 to connect to each other and/or other computer systems. Network interface logic 122 may also comprise other logic that may be configured to provide an interface for other types of devices, e.g., if the client computer system is another type of device such as a cell phone, smart phone, mobile e-mail device, other server-based computing device, and so on.

In an example embodiment, the enterprise computer system 130, back end systems 150a and 150b, may be provided by a software company. In another embodiment, the enterprise computer system 130 and the client computer system 110 may be provided by an entity that uses software provided by a software company. Likewise, other combinations are also possible.

In an example embodiment, the enterprise computer system 130 may include a central processing unit (CPU) 132, memory 134, network interface logic 136, data storage 139 and a generic value help search logic 140. Such logics may be implemented in a machine (e.g., one or more servers and other computers) comprising machine-readable storage media (i.e. cache, memory, flash drive or internal or external hard drive or in a cloud computing environment) having instructions stored therein which are executed by the machine to perform the operations described herein. The enterprise computing system 130 may be an implementation of a service oriented architecture comprising various interoperable services that each perform distinct functions.

The general value help search logic 140 provides value help. Value help may aid the user in selecting appropriate values when completing the fields or objects provided by an application i.e., user interface logic 112. For example, if the user does not know what the appropriate value for a particular field may be, the embodiments of the generic value help search logic 140 allow the user to click on value help and receive structured data from a remote backend system in order to allow the user to make an appropriate choice.

The generic value help search logic 140 may allow a user to access the pre-existing (e.g., legacy) search tools of the back end systems 150a and 150b via the user interface created by the user interface logic 112. For example, an application developer may wish to provide a value help search for a user relating to various fields in a form or program code. The help search logic allows the developer to utilize search tools that preexist in the back end systems 150a and 150b. The general value help search logic may be provided as one of the services in the service oriented architecture implemented by the enterprise computing system 130. Multiple instances of the generic value help search logic 140 may be initialized in the enterprise computer system 130 using the generic help search interface 118 from the client computer system 110, as needed. Each generic value help search logic 140 may be created automatically by the user requesting the value help for a particular field.

The generic value help search logic 140 may include a user interface generator logic 144. In order to use a pre-existing searches in the back end systems 150a and 150b, the developer of the generic help search interface 118 may know the name of the pre-existing value help search and/or the specific search help logic 160a and 160b implemented in the back end systems 150a and 150b, respectively. However, in other embodiments, the developer of the generic help search interface 118 may request the enterprise computer system 130 to perform a search tool in various backend systems and determine the name of the pre-existing value help search from the back end systems 150a and 150b.

The generic search help interface 118 may be configured to receive the name of the search from the client computer system 110. After receiving the name of the search to run, and the search criteria, the general value help search logic 140 can process the search and the search criteria provided by the user and send it to the appropriate back end system. The legacy search tools of the back end systems need not be configured as services in the service oriented architecture implemented by the enterprise computing system 130. The general value help search logic 140 provides a SOA interface to the legacy search tools for other services and components of the enterprise computing system 130. The back end system may perform the search, generate metadata and search results which may be sent to the enterprise computer system 130 for further processing, if necessary, or the results may be displayed on the users screen.

Also shown in FIG. 1 is the second network 124b used to communicate with a plurality of back end systems 150a and 150b. Each back end system 150a and 150b may have varying designs. However, in other example embodiments there may be any number of backend system with any number of specific search logics within them. In particular, the back end system 150a may have a plurality of specific search help logics 152a and 160a. The back end systems 150a and 150b may store data in a structured format such as a relational database or other structured data. When using the client computer system 110, the user may enter data in a structured form stored in the structured data 158a and 158b, thereby allowing for faster more accurate searches by the back end system searches. However, each backend system may return search results in a different format and thus, make it challenging to implement a generic value help search. Thus, the generic value help search logic 140 receives both metadata and a concatenated string of data which may be used to reconstruct the structure of the data.

The back end systems 150a and 150b include a CPU 154a and 154b. These CPUs may be a single or plurality of networked processors. Similarly, the back end systems 150a and 150b include memory 156a and 156b, respectively. As described above, the structured data 158a and 158b can be queried by the enterprise computer system 130. Upon receiving a query or search request, the back end systems 150a and 150b may return among other things, a table with the metadata for the selection screen or the metadata and the search result data. Generally metadata is data that describes other data. The metadata and the results can be used to reassemble the structured data. Moreover, the client computer system 110 is configured to receive the search criteria, and display the search criteria. However, the enterprise computer system 130 may be configured to receive information from the client computer system 110 and to receive information from the back end systems 150a and 150b. Although only two backend systems are shown, it will be appreciated that the enterprise computer system 130 may comprise any number of such backend systems.

The generic value help search logic 140 provides a generic value help search interface that does not have to be modified for each value help button even though each button may trigger accessing of different specific backend search tools. Moreover, the generic value help search logic 140 uses the pre-existing back end system and searches, which allows the generic value help search to leverage previous back end system solutions. In the architecture shown in FIG. 1, searching tasks are completed by the back end systems and the processing and generating the data display may be performed by the enterprise computer system 130. Thus, the client computer system 110 does not have to perform searches or gather the results directly from the back end system.

Figure 2:
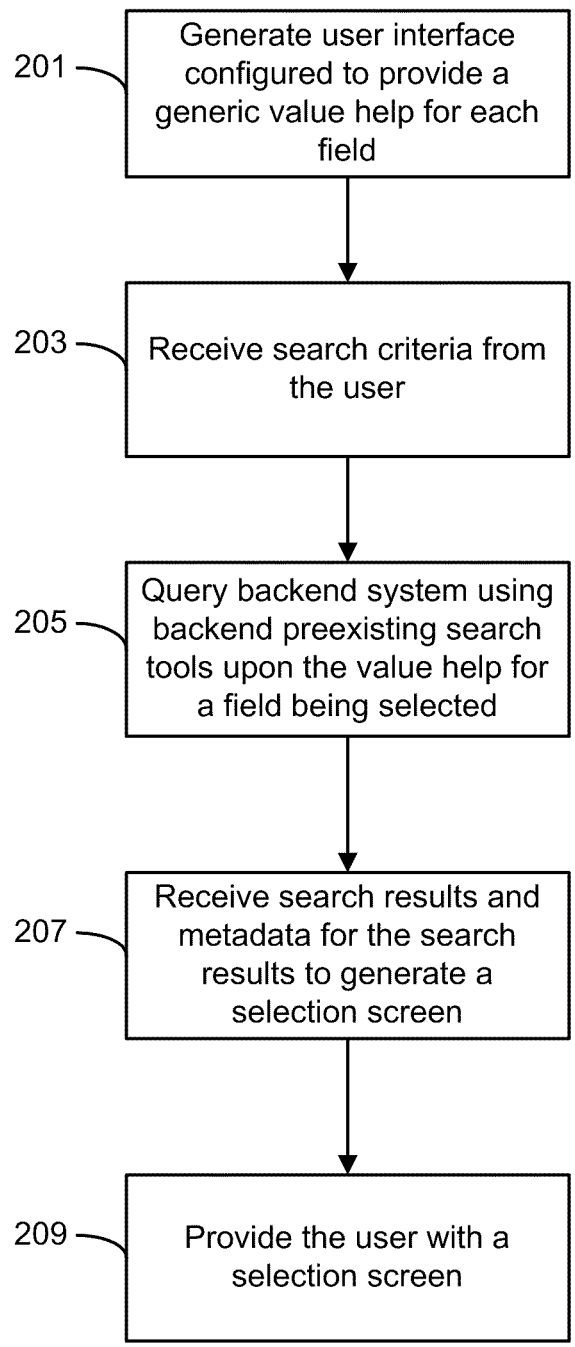
FIG. 2 is an example process that may be implemented using the system shown in FIG. 1.

Referring to FIG. 2, FIG. 2 is an example process that may be implemented using the system shown in FIG. 1. FIG. 2 shows a process in which the backend system is queried once for the value help search results and the search results include metadata and result data to assemble a search result table. At step 201, the client computer system 110 may generate a user display requiring a user's input with the generic search value help. At step 203, the user may be prompted to enter a particular search criteria, which may be forwarded to the back-end systems using enterprise computer system 130. At step 205, the backend system is queried using the criteria input by the user and the name of the value help search in the back end system. At step 207, the client computer system 110 may receive search results and metadata to generate a hit list screen for the user. At step 209, the user is provided with the hit list screen which displays the values that the user may select.

Figure 3:
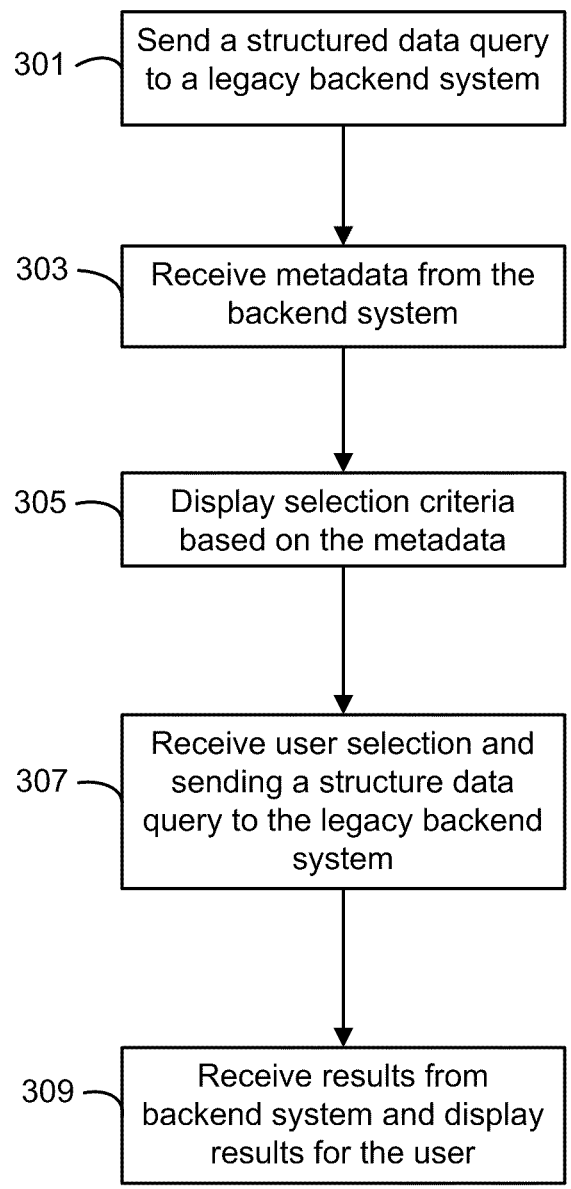
FIG. 3 is another example process that may be implemented using the system shown in FIG. 1.

Referring now to FIG. 3, FIG. 3 is another example process that may be implemented using the system shown in FIG. 1. FIG. 3 shows a process in which the backend system is queried twice. The first query to the backend system may return search criteria metadata and the second query to the backend system may use the search criteria to perform a search on the back end system. The results of the first search may be used to provide a user interface that allows the user to specify more detailed search criteria than would otherwise be possible with limited knowledge of the backend search tool that is being queried. The search results of the second search can include metadata and result data to assemble a search result table. In particular, at step 301, the user may send a structured data query to a legacy backend system. The query may be configured to identify the particular search that may be performed on the back end system. At step 303, the backend system will generate metadata data and the metadata may be received by the client computer system 110. The client computer system 110 displays selection criteria based on the metadata from the earlier search. At step 307, enterprise computer system 130 may receive the user selection and send a structured data query to the legacy backend system. The query may be configured to initiate a search in the back end system. At step 309, the results are received from the back end system and by using the metadata the results are converted to a table in a format displayable to the user.

Figure 4:
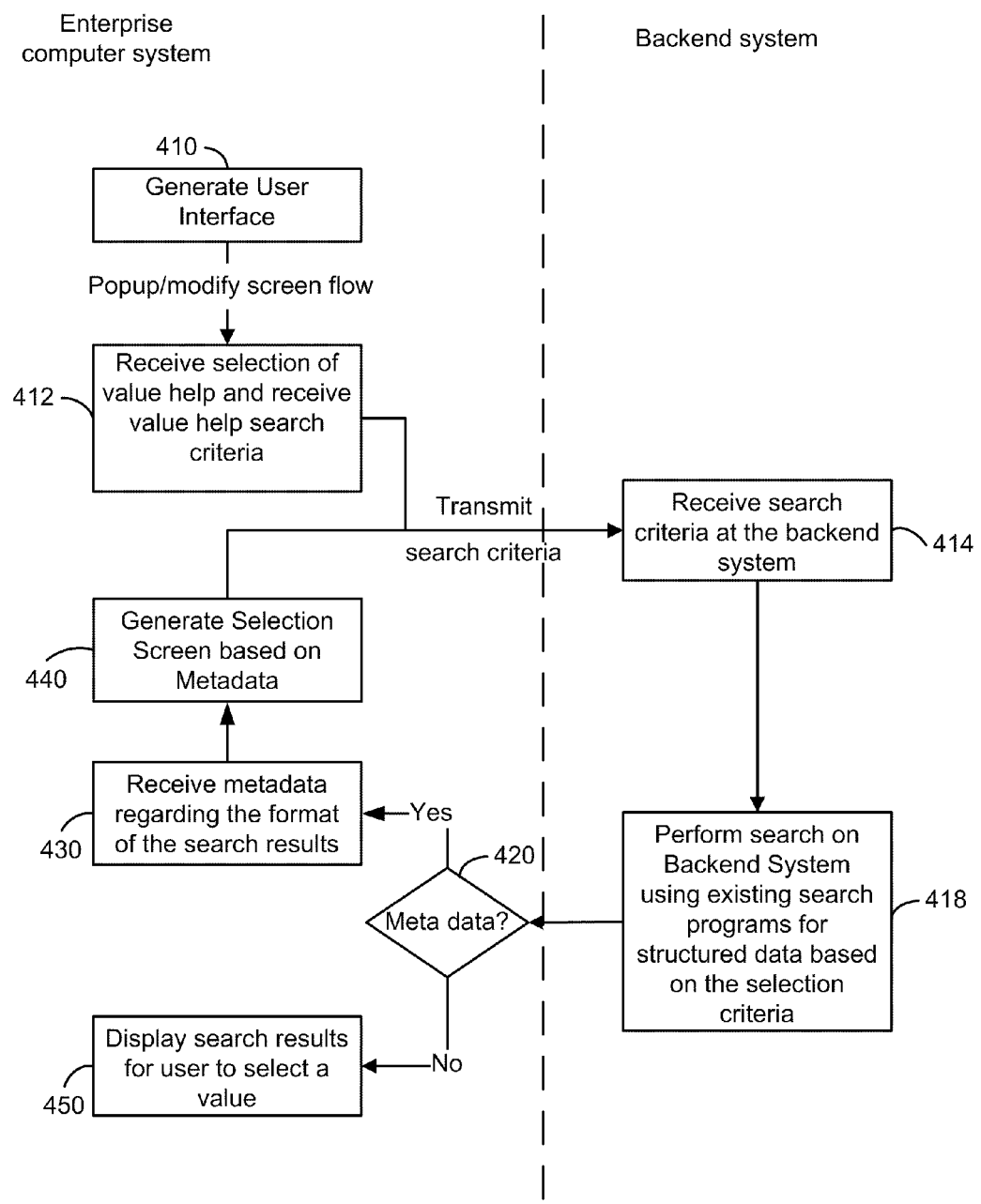
FIG. 4 is another example process that may be implemented using the enterprise system shown in FIG. 1.

Referring to FIG. 4, FIG. 4 is another example process that may be implemented using the enterprise system shown in FIG. 1. FIG. 4 shows a depiction of the process in which the steps that occur on enterprise computer system 130 are shown on the left side of the figure and the steps that are processed by the backend systems are shown on the right side. In particular, at step 410, a user interface is generated by the client computer system 110. The user interface includes links to a value help. Next, at step 412 if the user chooses to access the value help by clicking the value help button, a popup window or the screen flow is modified to receive the value help search criteria. The search criteria may be transmitted to the enterprise computer system 130 with the name of the particular value help search name. At step 414, the back end system 150a or 150b may receive the search criteria from the user. The backend system may perform the search at step 418 using existing search programs for structured data based on the search criteria input by the user. If the result of the first search is metadata, then the metadata is sent to the client computer system 110 at step 420 and received at step 430. Next, the client computer system 110 may generate a selection screen based on the metadata to generate a second search criteria at step 440. At step 414, the new value help search criteria may be transmitted to the back end system and the search may be performed by the backend system at step 418. The search results are transmitted to client computer system 110 and displayed for the user where the user is allowed to select a value to input into the user interface.

Figure 5:
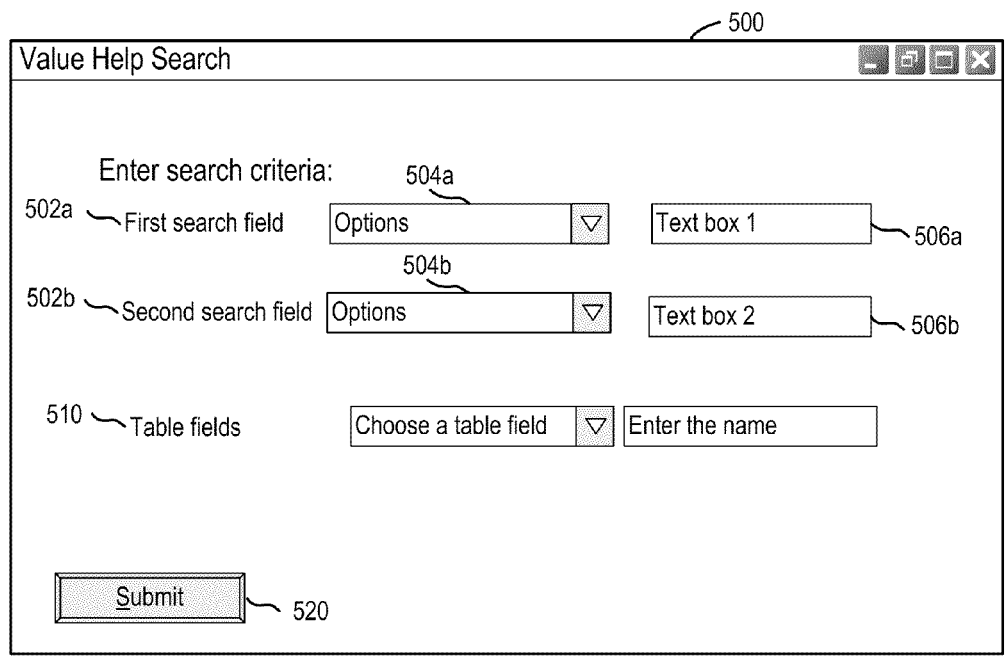
FIG. 5 is a screen display that may be shown to the user when the user requests value help.

Referring to FIG. 5, FIG. 5 is a screen display that may be shown to the user when the user requests a value help. The screen display 500 can be a pop window or a screen that changes the flow of the underlying application. The screen 500 offers the user the opportunity to enter a search criteria for the value help search. The first and the second search field 502a and 502b provide the user with the predetermined search criteria. The options 504a and 504b allow the user to choose various search parameters. Parameters such as but not limited to, equal to, not equal to, greater than/equal to, greater than, less than/equal to, less than, contains pattern, not contains patterns, between interval, and not between interval may be used by the user. Other options may be offered such as when entering the search criteria, the user is given the choice of limiting the number of results generated or the user can choose to receive the metadata prior to seeing the results.

Also shown on the search screen 500 are a first text box 506a and a second text box 506b that allow the user to enter search criteria. In other embodiments, one text box may be presented, similarly, in other embodiments more than two text boxes may be presented. In an example embodiment of the present invention, the developer of the value help search screen 500 may know the name of the search help in the backend system. The table fields 510 allows the user to choose a particular field in the table to be returned as a result of the value help search. Once the user has input the search criteria, the user can choose the submit button 520. Upon selection of the submit button 520, the client computer system 110 may send the value help search criteria to the enterprise computer system 130. The enterprise computer system 130 may receive the search request, and the enterprise computer system 130 may identify the back end system that is configured to perform the search. The back end system may be configured with a plurality of specific search help logics 152a, 160a, and 160b to perform searches. In an example embodiment, the developer of the generic help search interface 118 may specify which particular search to use or the user may enter the name of the search help.

Figure 6:
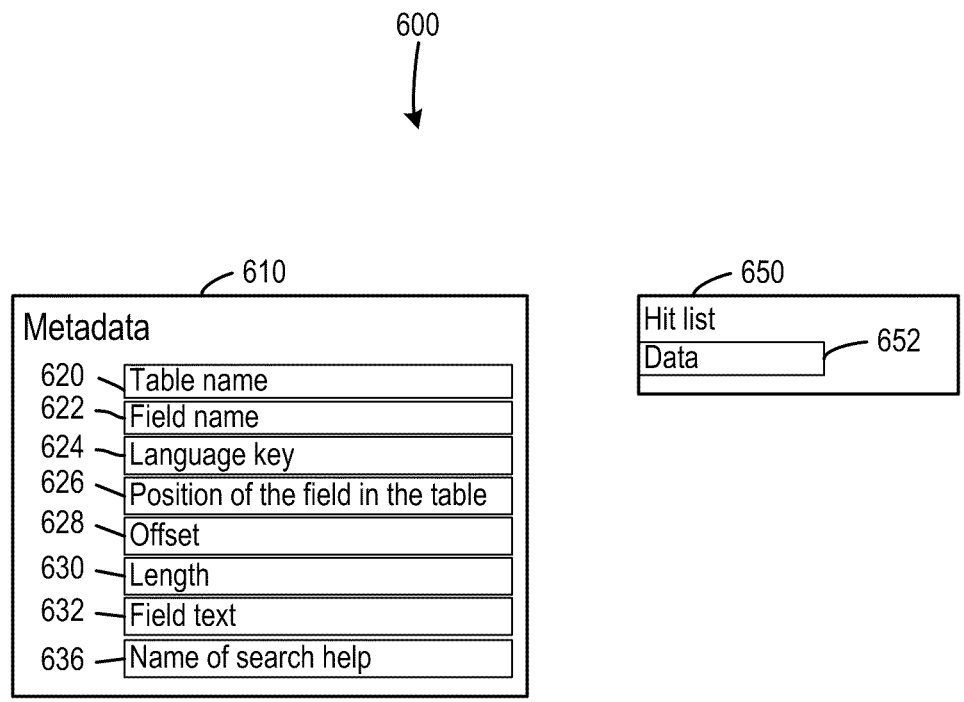
FIG. 6 shows the data that may be generated by the enterprise computer system after receiving the search results from a backend system.

Referring to FIG. 6, FIG. 6 is the data that may be received by the enterprise computer system 130 after performing the search on the backend system. In particular, the embodiments of the logic 140 are configured to use one service to send value help search requests to various backend systems. The enterprise computer system 130 receives the search results and determines how to construct a result table using metadata 610 shown in FIG. 6. Similarly, the metadata 610 may be used to convert the data into a user-friendly table. The metadata 610 may include, table name 620, field name 622, language key 624, position of the field in the table 626, offset 628, length 630, field text 632, field label 634, and name of the search help 636. Table name 620 may be the name of the table, which may be the title of the result table for the user. Field name 622 may be the name of the at least one field that was returned from the backend server. The language key 624 may identify the language of the results. Thus, the enterprise computer system 130 may assemble the results table in the appropriate language. The position of the field in the table 626 will allow enterprise computer system 130 to place the field text 632 in an appropriate position in the table. Similarly, the offset 628 combined with the length 630 (number of characters) allow the enterprise computer system 130 to assemble the results table for the user. The field text 632 provides a short description of the objects being transferred. The name of the search help 636 is also transmitted to the client computer system 110 to verify that the correct data was transmitted from the correct search help. Next, the hit list 650 includes the data 652 which includes all of the data that needs to be converted into a table using the metadata 610.

Referring to FIG. 7, FIG. 7 shows example metadata and the result data that may be returned as a search perform by a backend system. Value help 701 named "PREMK" was searched in the back end system. The table shown in FIG. 7 shows the metadata and the results 770. The metadata includes various fields that allow an enterprise computer system 130 to create a table for the user using results 770 and the metadata. The first column may be language 710, as shown in this example the language is E used for English. Field text 715 stores the text of that should be displayed for each field. Also shown in FIG. 7 is the position 730, offset 735 and the length 755 which may allow the enterprise computer system 130 place the data from the results 770 in the correct location in the table that may be displayed to the user. The results 770 may be a concatenated string of characters that can be displayed in a structured data format of a table. However, in order to display the concatenated string of characters in a structured format the enterprise computer system 130 may use the metadata shown in FIGS. 6 and 7. The use of the metadata may allow the embodiments of the generic value help search service 140 to implement a generic value help search.

Figure 8:
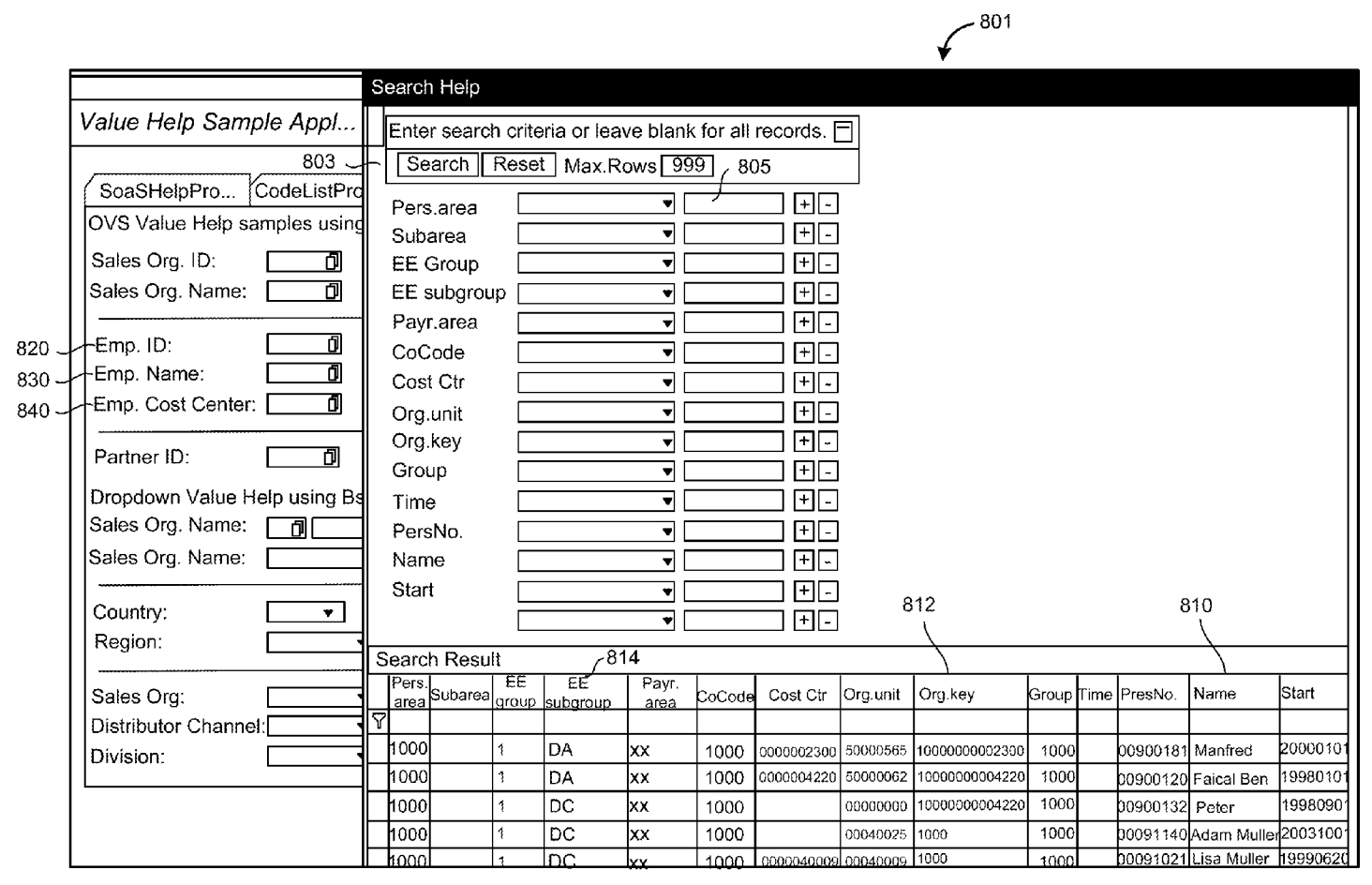

Referring to FIG. 8, FIG. 8 is a screen display that may be shown to the user when the user requests value help search. As shown in FIG. 8 the user has not entered a search criteria in the text box 805 provided by the value help search service. Instead, the user selected search button 803 causing the enterprise computer system 130 to send a request to the backend system and return a set of results. The screen display of FIG. 7 shows the metadata 710 to 765 and the result data 770 that may be used to generate the result table shown in FIG. 8. In particular the rows of the field text 715 or scrtextm 720 metadata may be used as the columns of the search result. Also the result data 770 is used as the column entries, for example the first entry "Manfred Feinhardt", is shown as the first entry under name 810 column. FIG. 8 allows the user to choose one of the search entries and the help search interface 118 enters each of the employee Id 820, employee name 830 and employee cost center 840 into each respective field. Thus, the system 100 as allows the user to enter information regarding a particular set of logically related fields (i.e. 820, 830 and 840) by selecting one of the search results.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products or logics comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method for implementing a value help search, comprising:
    receiving, at a server computer system in a service oriented architecture system, a value help search criteria from a client computing device, the value help search criteria being received at a generic value help search service configured to send value help requests originating from multiple client computing devices to multiple back end systems, at least some of the back end systems comprising legacy search help logic;
    sending the value help search criteria to the multiple back end systems;
    receiving, by the generic value help search service, search criteria metadata;
    prompting a user of the client computing device to enter a second search criteria using the search criteria metadata;
    selecting, at the server computer system, at least one back end system from the multiple back end systems based on the second search criteria received from the client computing device, the second search criteria indicating a name of particular search help logic associated with the at least one back end system;
    sending, by the value help search service, the second search criteria to the particular search help logic associated with the at least one back end system;
    receiving, by the value help search service, metadata and result data from the particular search help logic associated with the at least one back end system, the metadata describing a structure of the result data, the structure indicating a layout of the result data; and
    using the metadata to parse the result data and generate a search result table from the result data.

2. The method of claim 1, further comprising providing a user interface configured to allow the user to select at least one result from the search result table.

3. The method of claim 1, wherein the multiple back end systems are implemented using different types of computer systems that include providing search results in various formats.

4. The method of claim 3, wherein the different types of computer systems includes using different operating systems, hardware and/or software.

5. The method of claim 1, wherein generating the search result table includes correlating rows of the metadata to a field in the result data.

6. The method of claim 1, wherein sending the search criteria includes sending multiple search criteria parameters in the form of a structured data query to the back end system.

7. A computer-implemented method for implementing a value help search, comprising:
    receiving, at a server having a generic value help search service, a request for the value help search from a client computer, the generic value help search service configured to accept request from multiple client computers;
    sending, by the value help search service at the server, a structured data search request to at least one back end system of two or more backend systems, the two or more back end systems comprising at least two legacy search help logics;
    receiving search criteria metadata at the server from the at least one back end system, the search criteria metadata including names of the search help logics;
    displaying one or more search criteria based on the search criteria metadata;
    receiving a selection of search criteria, the selected search criteria including a name of a particular search help logic;
    identifying, at the server, the particular search help logic of the at least one back end system based on the selected search criteria;
    sending a second structured data request based on the selected search criteria to the particular search help logic of the at least one back end system to initiate the value help search;
    receiving, by the value help search service at the server, metadata and result data from the particular search help logic of the at least one back end system, the metadata describing a structure of the result data, the structure indicating a layout of the result data; and
    using the metadata to parse the result data and generate data used to display a search result table from the result data.

8. The method of claim 7, wherein sending the selected search criteria includes sending multiple search criteria parameters in the form of a structured data query to the back end system.

9. The method of claim 7, wherein the two or more back end systems are implemented using different types of computer systems that include providing search results in various formats.

10. The method of claim 7, further comprising providing a user interface configured to allow a user of the client computer to select at least one result from the search result table.

11. The method of claim 7, wherein the result data is a concatenated string of data and generating the search result table includes correlating rows of the metadata to a field in the result data.

12. A server computer system in a service oriented architecture system comprising:
    one or more processors; and
    a memory storing logic configured to, when executed by the one or more processors, cause the system to perform operations, the logic comprising:
    a value help search logic configured to receive, via a network interface logic, a value help search criteria from a remote client computing device, the value help search criteria being received at the server computer system in the service oriented architecture system, the value help search logic being included in a value help search service and configured to receive value help search requests from multiple remote client computing devices and to send, via the network interface logic, the value help requests to multiple back end computer systems, at least some of the back end computer systems comprising legacy search help logic;

the value help search logic configured to send, via the network interface logic, the value help search criteria to the multiple back end systems and to receive, via the network interface logic, search criteria metadata;

the value help search logic configured to prompt a user of the client computing device to enter a second search criteria based on the search criteria metadata;

the value help search logic configured to select at least one back end system from the multiple back end systems based on the second search criteria received from the client computing device, the second search criteria indicating a name of a particular search help logic associated with the at least one back end system;

the value help search logic configured to send, via the network interface logic, the second search criteria to the at least one back end system;

the value help search logic configured to receive, via the network interface logic, metadata and result data from the particular search help logic of the at least one of the multiple back end systems, the metadata describing a structure of the result data, the structure indicating a layout of the result data; and the value help search logic configured to use the metadata to parse the result data and to generate a search result table from the result data received from the at least one of the multiple back end system.

13. The system of claim 12, wherein the value help search logic is configured to generate a user interface for the user to select at least one result from the search result table that populates multiple fields in the user interface.

14. The system of claim 12, wherein the multiple back end systems are implemented using different types of computer systems that include providing search results in different formats.

15. The system of claim 14, wherein the different types of computer systems includes different operating systems, hardware and/or software.

16. The system of claim 12, wherein the value help search logic correlates rows of the metadata to a field in the result data.

* * * * *